Feb. 3, 1953
A. E. FORSYTH
2,627,403
VEHICLE SUSPENSION DEVICE
Filed July 19, 1947
3 Sheets-Sheet 1
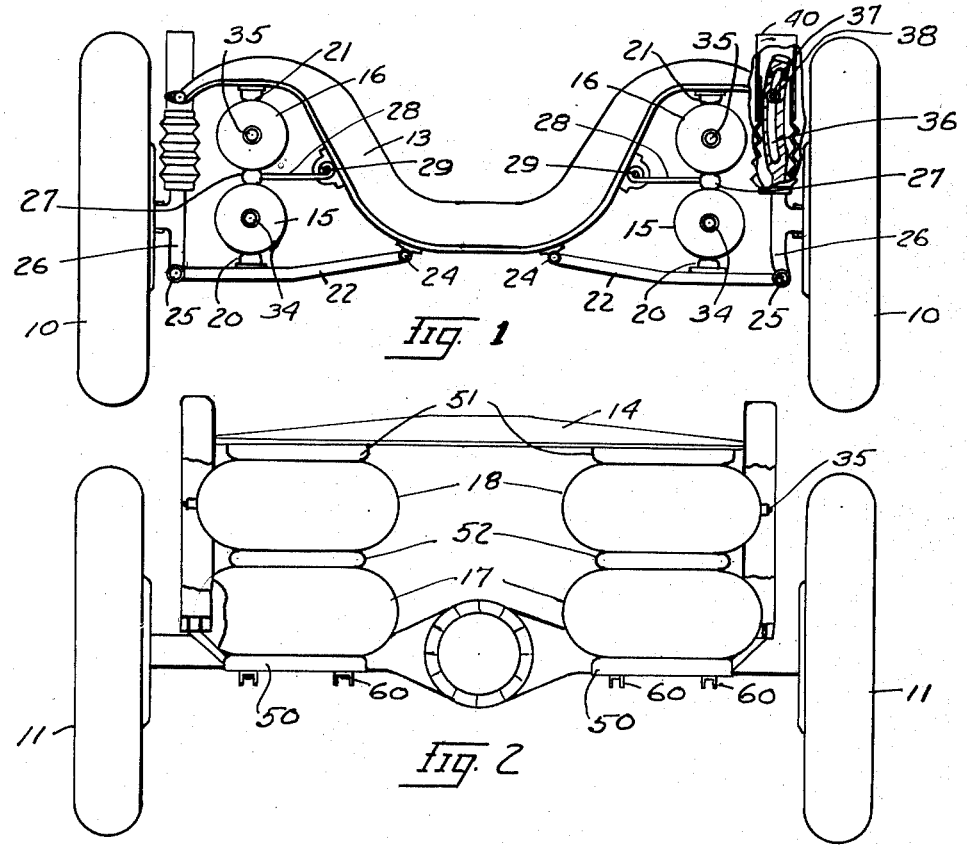
Fig. 1
Fig. 2
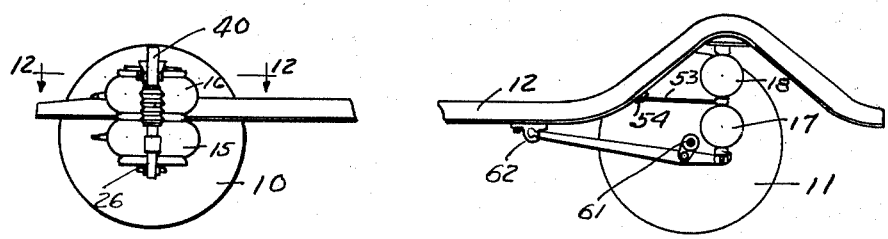
Fig. 3
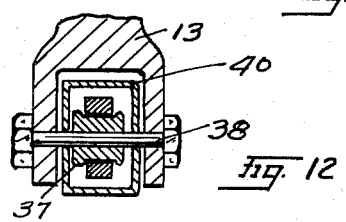
Fig. 12
INVENTOR.
ALBERT E. FORSYTH
BY
Bates, Teare, & McBean
ATTORNEYS

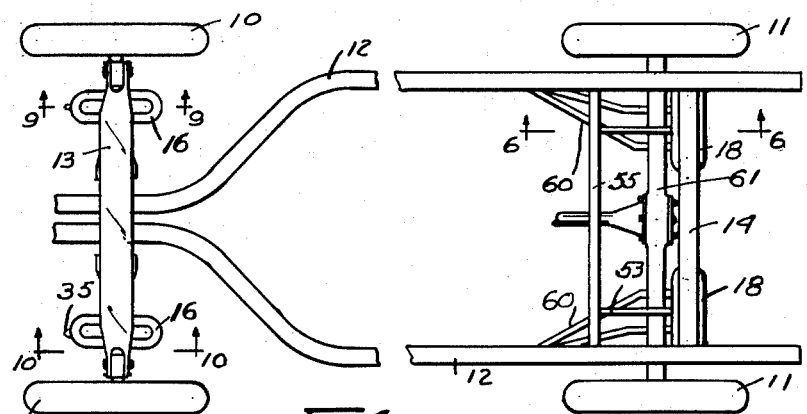
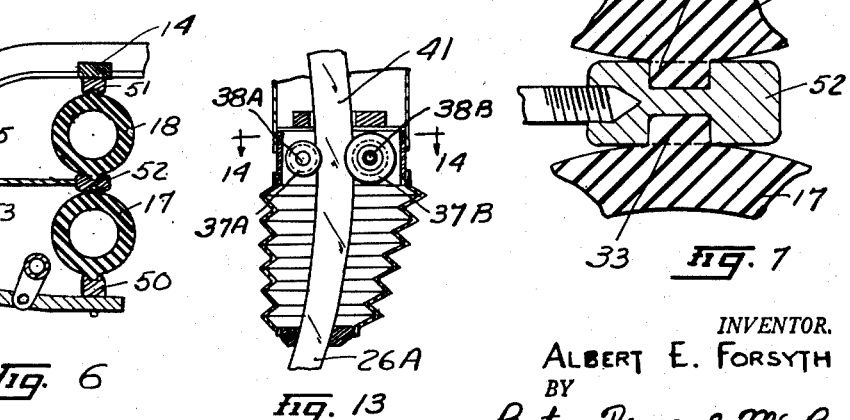

Feb. 3, 1953 A. E. FORSYTH 2,627,403
VEHICLE SUSPENSION DEVICE
Filed July 19, 1947 3 Sheets-Sheet 3
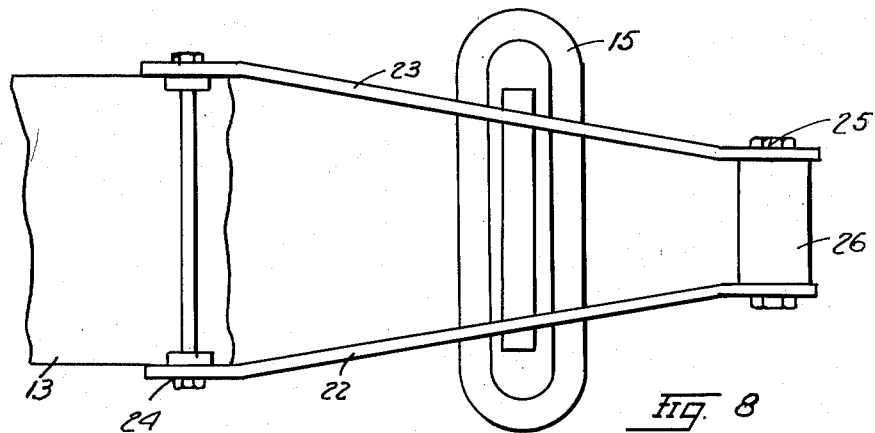
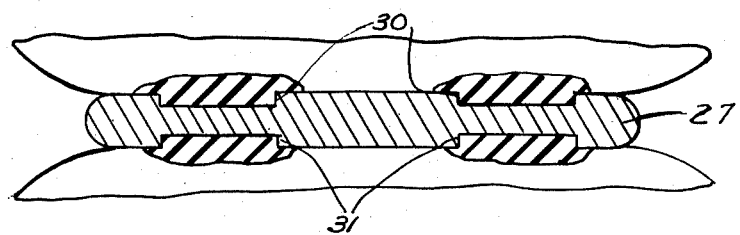
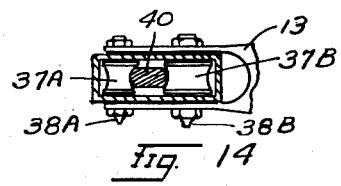
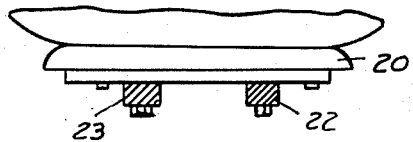
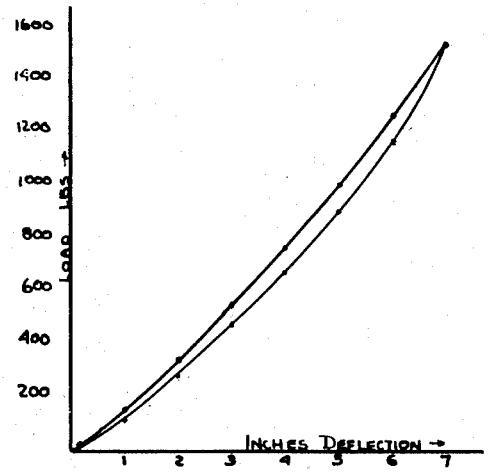
INVENTOR.
ALBERT E. FORSYTH
BY
Bates, Peare & McBean
ATTORNEYS Patented Feb. 3, 1953

2,627,403

UNITED STATES PATENT OFFICE 2,627,403

VEHICLE SUSPENSION DEVICE

Albert E. Forsyth, Britannia Bay, Ontario, Canada

Application July 19, 1947, Serial No. 762,117

6 Claims. (Cl. 267—15)

This invention relates to pneumatic spring suspension devices for vehicles and is particularly concerned with the provision of a pneumatic connection between the chassis frame and the wheel supports.

Pneumatic spring suspension devices utilizing two inflatable flexible elements, one superimposed upon the other have heretofore been proposed, but in all such instances the upper element has been supported directly on the lower, thus resulting in the necessity for means for maintaining the containers in alignment, notwithstanding side thrusts to which the wheels of the vehicle may be subjected during use.

An object of the present invention is to utilize a pair of coacting resilient and inflatable elements and to support them with reference to the frame so as to withstand all conditions normal to the operation of the vehicle without necessitating extensive extraneous means for maintaining the containers in proper operating relationship.

An additional object of the present invention is to so connect the frame and front wheel supports as to maintain proper wheel alignment, notwithstanding the arcuate movement of the wheel support with respect to the frame as the vehicle moves over an uneven roadway.

In the drawings, Fig. 1 is a front view, partially in section, of a vehicle frame having the present invention attached thereto; Fig. 2 is a rear view of the vehicle showing the invention positioned adjacent to the rear wheels; Fig. 3 is a side view partly in section of the frame with the pneumatic suspension devices embodying the present invention attached thereto; Fig. 4 is a top plan view of the frame and assembled suspension elements; Fig. 5 is a bottom plan view of the apparatus shown in Fig. 4; Fig. 6 is a section taken on the line 6—6 in Fig. 4; Fig. 7 is a section showing a portion of the container and saddle assembly of Fig. 6 but on a scale larger than that of Fig. 6; Fig. 8 is a fragmentary bottom plan view of the pneumatic element assembly for the front wheels but on a scale larger than that shown in Fig. 5; Fig. 9 is a section taken on a plane indicated by the lines 9—9 in Fig. 4 but on a scale larger than that shown in Fig. 4; Fig. 10 is a section taken on a plane indicated by the lines 10—10 in Fig. 4; Fig. 11 is a load deflection curve of a cushion assembly embodying the present invention; Fig. 12 is a section taken on a plane indicated by the line 12—12 in Fig. 3; Fig. 13 is a vertical section through the front wheel support showing a modification of my invention, and Fig. 14 is a section taken on a plane indicated by the line 14—14 in Fig. 13.

The present invention is shown in connection with a motor vehicle having front wheels 10, rear wheels 11 and a frame embodying longitudinally extending members 12, a front cross member 13 and a rear cross member 14. The invention utilizes pneumatic cushion elements for resiliently supporting the frame, and such elements are arranged in pairs adjacent each wheel, the forward elements being indicated at 15 and 16 respectively, and the rearward elements being indicated at 17 and 18 respectively. Each lower element adjacent the front wheels is supported upon a pad 20 and each upper element of the forward pairs is positioned by a pad 21. The lower pads may be carried by wishbone arms 22 and 23 that are pivoted to the cross member 13 at 24, and are pivoted at 25 to the wheel support 26, as is shown in Fig. 1.

Intermediate each pair of elements 15 and 16 is a saddle 27 which is held in position by means of a guide bar 28, one end of which is rigidly attached to the associated saddle and the other end of which is pivotally connected at 29 to the cross member 13.

As shown in Figs. 7 and 9, each saddle 27 has recesses 30 and 31 on the top and bottom surfaces respectively, while the cushion elements have lugs 32 and 33 which are adapted to occupy the recesses 30 and 31 respectively. Each cushion element is arranged to be inflated independently of the other through valves indicated at 34 and 35 respectively.

To guide the front wheels, each support 26 has a curved slot 36 therein which embodies a cam guide in which a roller 37 is adapted to operate. The roller is journalled on a pin 38. In Fig. 12 the pin is illustrated as being carried by the forked end of the cross member 13. The member 13 also has rigidly attached thereto a box-like member 40 which constitutes a guide for the upper portion of the member 26. The curvature of the slot 36 compensates for an arcuate movement imparted to the wheel during the pivotal action of the wishbone frame 22 with reference to the cross member 13.

In Figs. 13 and 14 I have illustrated a modification of the front wheel guide wherein the upper portion of the support 26A constitutes a bar 41 which is guided between rollers 37A and 37B, which are journalled on pins 38A and 38B respectively. The pins in turn are carried by the forked end of the cross member 13. This form of construction eliminates the need for making a slot in the wheel supporting member.

Referring now to the suspension element adjacent the rear of the vehicle, the lower elements 17 are supported upon pads 50, while the upper elements 18 are positioned by pads 51. A saddle 52 is interposed between the lower and upper elements of each pair and each saddle in turn is attached to a rod 53, the end of which, remote from the saddle, is pivotally connected at 54 to a cross member 55 which extends between the frame members 12. Each saddle 52 has recesses that receive complementary shaped lugs on the associated cushioning elements in a manner similar to that illustrated in Figs. 7, or Fig. 9 of the front cushioning elements.

The pads 50 are supported upon a wishbone frame 60 which is attached intermediate its ends to an axle housing 61, and which is connected, as by a ball and socket joint 62, adjacent its forward end to the longitudinal member of the frame.

The cushioning elements are generally of cylindrical formation, and I have found that the width of the saddle for a predetermined diameter of cushion element is a factor in determining the most desirable load-deflection curve. Thus, for example, a cushion element having an outside diameter of 6" and inflated to 20 lbs. per square inch produces best results when the saddle is 1½" in width. The length of the saddle should be sufficient to extend for the length of the cylindrical portion of the element, as is shown for example in Figs. 2 and 3.

A load-deflection curve for cushion elements and saddle having the dimensions aforesaid is illustrated in Fig. 11, wherein the abscissae constitute deflection in inches and wherein the ordinates designate the load in pounds. The upper curve shows the deflection characteristics as the load is applied, and the lower curve shows the characteristics as the load is released. The curve shows a gradual and uniform deflection that produces an adequate spring range for the size of cushion element utilized.

The present invention is advantageous in that the saddles which are interposed between the cushion elements operate to produce a uniform deflection and, at the same time, to hold the cushion elements in superimposed operating relationship in a simple and expeditious manner. The utilization of a curved cam slot connection between the front wheel support and the frame serves to maintain front wheel alignment, notwithstanding relative vertical movement of the wheel support with reference to the frame.

I claim:

1. In combination, two movable members disposed in vertical spaced relationship to each other and adapted to be moved toward and away from each other, a pair of pneumatic elements each being the same size and generally cylindrical in shape and arranged in superimposed relationship and providing a spacing and load-transmitting medium between said members, a saddle disposed between the elements and extending in the same general direction as said elements, the width of the saddle being approximately one-fourth that of the diameter of the pneumatic element.

2. In combination, a vehicle frame, a wheel support therefor, a member pivotally connected at one end to the frame and at the other end to the wheel support, resilient means disposed between the member and the frame and providing a spacing and load-transmitting medium therebetween, said wheel support having a substantially vertical extension, said extension being connected with the frame by an outwardly concave guide on one of them and a coacting member engaging the guide on the other of them.

3. In combination, a vehicle frame, a wheel support therefor, a member pivotally connected at one end to the frame and at the other end to the wheel support, pneumatic means disposed between the member and the frame and providing a spacing and load-transmitting medium therebetween, said wheel support having a substantially vertical extension, said extension being connected with the frame by an outwardly concave slot in one of them and a pin on the other.

4. In combination, two movable members disposed in vertical relationship to each other and adapted to be moved toward and away from each other, a pair of elongated pneumatic elements arranged in superimposed relationship providing a spacing and load transmitting medium between said members, the walls of each element being convex and resilient throughout, a saddle disposed between said elements along the aligned vertical axis, and having a width in the convex plane and transverse to the elongated axis of said elements less than the combined overhanging convex portions of one of said elements on either side of the saddle, and a rigid arm pivotally connecting the saddle to one of said movable members.

5. In combination, a vehicle frame, a wheel support, a pair of pneumatic elements for suspending the frame above the support, each of said elements comprising an inflatable substantially cylindrical member having rounded ends, the cylindrical portions extending in the same general direction, a substantially flat member disposed along the aligned vertical axis between the elements and having an interlocking connection therewith, said flat member having a width in a plane normal to the cylindrical axis of each element less than the combined overhanging portions of one of said elements on either side of the flat member and having a length substantially equivalent and parallel to the cylindrical axis of each element, and a rigid arm pivotally connecting the interposed flat member to said frame.

6. In combination, a vehicle frame, a wheel support, a pair of pneumatic elements for suspending the frame above the support, each of said elements comprising an inflatable substantially cylindrical member disposed in vertical alignment relative to each other, a saddle disposed along the aligned vertical axis between the elements and having a width normal to the cylindrical axis and less than the combined overhanging portions of one of said elements on either side of the saddle, the saddle having spaced recesses in the top and bottom surfaces thereof, each of the elements having lugs integral therewith and extending into the corresponding recesses to provide a free interlocking connection with the saddle, and a rigid arm pivotally connecting the saddle to the frame independently of the elements.

ALBERT E. FORSYTH.

REFERENCES CITED

The following references are of record in the file of this patent:

UNITED STATES PATENTS

| Number | Name | Date |
|---|---|---|
| 960,579 | Perkins | June 7, 1910 |
| 1,171,942 | Goodwin | Feb. 15, 1916 |
| 1,273,813 | Bernat | July 30, 1918 |
| 1,436,144 | Bernat | Nov. 21, 1922 |
| 1,679,853 | Cottin | Aug. 7, 1928 |
| 1,915,303 | Forsyth | June 27, 1933 |
| 2,023,135 | Hawkins | Dec. 3, 1935 |
| 2,045,027 | Sanford | June 23, 1936 |
| 2,094,582 | Chapman | Oct. 5, 1937 |
| 2,113,382 | Oppenheimer | Apr. 5, 1938 |
| 2,355,274 | Castiglia | Aug. 8, 1944 |

FOREIGN PATENTS

| Number | Country | Date |
|---|---|---|
| 155,565 | Great Britain | Oct. 1, 1920 |
| 220,977 | Great Britain | Aug. 27, 1924 |
| 339,625 | Great Britain | Dec. 8, 1930 |
| 843,699 | France | Apr. 3, 1939 |